March 10, 1925.
W. H. SCHAFER
AUTOMOBILE LIFTING JACK
Filed Aug. 26, 1921
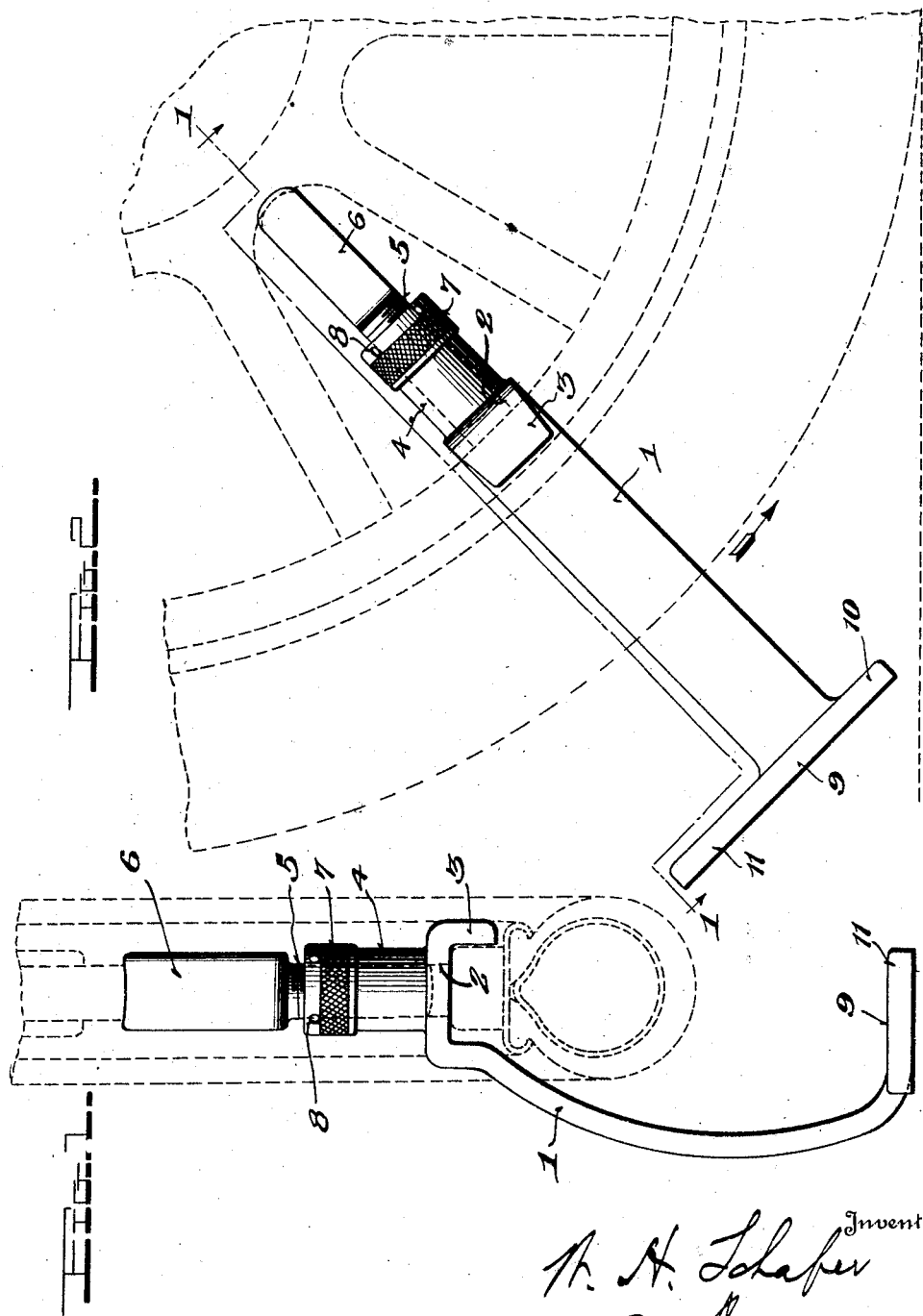

Patented Mar. 10, 1925.

1,529,039

UNITED STATES PATENT OFFICE.

WILLIAM H. SCHAFER, OF MINNEAPOLIS, MINNESOTA, ASSIGNOR, BY DIRECT AND MESNE ASSIGNMENTS, TO GEORGE W. HAINES, OF YOUNGSTOWN, OHIO.

AUTOMOBILE LIFTING JACK.

Application filed August 26, 1921. Serial No. 495,496.

*To all whom it may concern:*

Be it known that I, WILLIAM H. SCHAFER, a citizen of the United States, residing at 2876 Humboldt Avenue south, Minneapolis, in the county of Hennepin and State of Minnesota, have invented certain new and useful Improvements in Automobile Lifting Jacks, of which the following is a specification.

This invention relates to certain new and useful improvements in lifting jacks and pertains more particularly to a lifting jack that is attached to the wheel of an automobile, following which the automobile raises itself upon being driven or moved for a short distance.

The primary object of the invention is to provide a jack which is simple construction and capable of economical production; which can be easily applied to and removed from the wheel and which is of compact form occupying small space when stored in the car.

A further object of the invention is to provide a jack of this type which involves a minimum of moving parts subject to derangement and one wherein such parts can be easily and quickly operated with the expenditure of slight force.

Figure 1 is a front elevation of the invention; and

Figure 2 is a side elevation.

In proceeding in accordance with the present invention, a body 1 is empolyed, which is suitably curved, as depicted in the drawings in order to extend around the rim, felloe and tire of the wheel. The inner end of the body is formed with a right angular head 2, the latter having an end 3 which is extended downwardly. The end 3 constitutes a rigid jaw, which overlies the outer side of the wheel rim, while the head 2 seats upon or engages the inner circumference of the wheel felloe and the part of the body adjacent to the head forms a second rigid jaw engaging the inner side of the felloe and tire. The head thus has an approximately U-conformation forming a rigid jaw of that shape which receives the felloe and tire of the wheel and which seats upon the inner circumference of the wheel felloe.

The head 2 is equipped with a rigid bearing 4 within which is received a threaded stem 5, which latter rigidly carries a head 6, forming a movable jaw, a knurled nut 7 being mounted on the threaded stem and equipped with a hole 8, so that by inserting a handle or rod in the hole 8 power may be applied to rotate the nut and thereby effect desired adjustment of the head or jaw 6.

The lower or outer end of the body is equipped with a preferably integral and horizontal ground engaging foot 9 having a heel 10 and a toe 11, the foot being arranged to extend in a plane at right angles to the plane in which the head 2 extends.

In operation, the jack is applied to the wheel by disposing the same on the inner side of the wheel at an incline to the ground and with the U-head or rigid jaw 2 engaged with the inner circumference of the felloe and with opposite sides of the felloe and tire, the toe 11 being faced in the direction opposite to that in which the car is to be moved. The nut 8 is now rotated to drive the movable head or jaw 6 against the hub portion of the wheel at a point in the space between two adjacent spokes until the jack is firmly clamped between the felloe and the hub of the wheel. The car is now moved or driven forwardly causing the heel 10 to engage upon or with the ground, whereupon the heel becomes a fulcrum about which the car moves vertically until the jack occupies a vertical position, when movement of the car is stopped, and the latter has thus been raised above the ground at points adjacent the wheel. The toe 11 being of greater length than the heel will act to arrest further movement of the foot and will afford a firm support for the jack in holding the car in its raised position. In this described action of the foot the movement is similar to that of a person in walking.

From the foregoing, it will be apparent, that the device can be easily and quickly clamped to the wheel and as easily removed following further movement of the car to bring the foot 11 up above the ground. The moving parts subject to derangement are at minimum, and the entire device can be stored in a small space within the car.

What is claimed is:

1. In an automobile lifting jack, a body having a curved portion formed at its upper end with a right angular head one end of which is extended for a relatively short distance toward the base of the body to form a substantially U-shaped felloe receiving part, a rigid bearing secured to the outer face of the right angular head and having a longitudinal bore, a movable jaw engageable with the wheel hub and having a threaded stem received in the bore of the bearing, a nut threaded on the stem and seated on the outer end of the bearing to effect adjustment of the jaw, and a plate-like foot on the base of the body secured to the latter to one side of its longitudinal center to form a heel and an elongated toe.

2. In an automobile lifting jack, a body having a curved portion formed at its upper end with a right angular head one end of which is extended for a relatively short distance toward the base of the body to form a substantially U-shaped felloe receiving part, a rigid bearing secured to the outer face of the right angular head and having a longitudinal bore, a movable jaw engageable with the wheel hub and having a threaded stem received in the bore of the bearing, a nut threaded on the stem and seated on the outer end of the bearing to effect adjustment of the jaw, and a ground engaging device secured to the lower end of the base.

3. In an automobile lifting jack, a body shaped to engage about the side of the wheel felloe and tire and having a substantially right angular head which engages the inner circumference of the wheel felloe and having its inner end relatively short and extending toward but spaced from the inner circumference of the demountable rim and formed to engage one of the side faces of the felloe, a ground engaging foot on the lower end of the body, a movable jaw to engage the hub of the wheel, and adjustable means between the jaw and the head to move the jaw against the wheel hub so as to support the weight of the automobile from the hub of the wheel to which the jack is applied, the body being completely open between the inner end of the right angular head and the ground engaging foot to allow the demountable rim to be moved through the said open part of the body.

4. In an automobile lifting jack, a body, a member carried by the body and formed to engage the inner circumference of the wheel felloe, a ground engaging member carried by the body, means formed to engage against the hub portion of the wheel, and adjustable means between the first member and the hub-engaging means to connect the body to the wheel, said body being completely open on one side thereof at points between the first named member and the ground engaging means to allow the demountable rim to be moved through said open part of the body while the jack remains connected to the wheel.

In testimony whereof I affix my signature.

WILLIAM H. SCHAFER.